United States Patent
Boesch

(10) Patent No.: US 7,181,228 B2
(45) Date of Patent: Feb. 20, 2007

(54) SYSTEM AND METHOD FOR ESTABLISHING AND MONITORING THE RELATIVE LOCATION OF GROUP MEMBERS

(75) Inventor: Brian Boesch, Oak Hill, VA (US)

(73) Assignee: Corporation for National Research Initiatives, Reston, VA (US)

( * ) Notice: Subject to any disclaimer, the term of this patent is extended or adjusted under 35 U.S.C. 154(b) by 0 days.

(21) Appl. No.: 10/806,845

(22) Filed: Mar. 23, 2004

(65) Prior Publication Data

US 2005/0143096 A1 Jun. 30, 2005

Related U.S. Application Data

(60) Provisional application No. 60/533,748, filed on Dec. 31, 2003.

(51) Int. Cl.
*H04Q 7/20* (2006.01)
(52) U.S. Cl. ............... 455/456.1; 455/421; 455/422.1; 340/539.15
(58) Field of Classification Search ............. 455/404.2, 455/404.1, 456.1, 456.3
See application file for complete search history.

(56) References Cited

U.S. PATENT DOCUMENTS

| | | | |
|---|---|---|---|
| 4,275,398 A | 6/1981 | Parker et al. | |
| 4,673,936 A | 6/1987 | Kotoh | |
| 5,014,040 A * | 5/1991 | Weaver et al. | 340/568.1 |
| 5,043,736 A | 8/1991 | Darnell et al. | |
| 5,442,805 A * | 8/1995 | Sagers et al. | 455/456.5 |
| 5,485,163 A | 1/1996 | Singer et al. | |
| 5,557,259 A * | 9/1996 | Musa | 340/573.4 |
| 5,731,757 A | 3/1998 | Layson, Jr. | |
| 5,841,396 A | 11/1998 | Krasner | |
| 5,874,914 A | 2/1999 | Krasner | |
| 6,014,080 A * | 1/2000 | Layson, Jr. | 340/573.1 |
| 6,064,336 A | 5/2000 | Krasner | |
| 6,076,099 A | 6/2000 | Chen et al. | |
| 6,100,806 A * | 8/2000 | Gaukel | 340/573.4 |
| 6,104,931 A | 8/2000 | Havinis et al. | |
| 6,111,538 A | 8/2000 | Schuchman et al. | |
| 6,111,539 A | 8/2000 | Mannings et al. | |
| 6,140,956 A | 10/2000 | Hillman et al. | |
| 6,169,497 B1 | 1/2001 | Robert | |

(Continued)

*Primary Examiner*—Lester G. Kincaid
*Assistant Examiner*—Fred A. Casca
(74) *Attorney, Agent, or Firm*—Robert Mardula & Wertheim, LLC

(57) ABSTRACT

Systems and methods for monitoring a perimeter for ingress or egress by a member of an ad hoc wireless network. A wireless device is equipped with location means. In an embodiment, the wireless device is a cellular telephone equipped with a GPS chip set. A plurality of such wireless devices form an ad hoc network and are linked to a server in association with each other. The server receives retains perimeter boundary data and receives positioning information from each of the plurality of associated wireless devices. The locations of each member of a network are tracked relative to perimeter. A perimeter may be an egress perimeter, which defines an area in which monitored units are permitted to roam but from which network members may not leave. A perimeter may be an ingress perimeter, which defines an area in which monitored units are not permitted to enter. An ingress perimeter may reside within an egress perimeter. The system provides warnings when a perimeter boundary is approached or crossed.

32 Claims, 4 Drawing Sheets

U.S. PATENT DOCUMENTS

| | | |
|---|---|---|
| 6,172,640 B1 | 1/2001 | Durst et al. |
| 6,243,039 B1 * | 6/2001 | Elliot .......................... 342/457 |
| 6,362,778 B2 | 3/2002 | Neher |
| 6,788,200 B1 * | 9/2004 | Jamel et al. ........... 340/539.13 |
| 6,825,767 B2 * | 11/2004 | Humbard ................. 340/573.1 |
| 7,015,817 B2 * | 3/2006 | Copley et al. ........... 340/573.4 |
| 2004/0046667 A1 * | 3/2004 | Copley .................... 340/573.4 |

* cited by examiner

SYSTEM AND METHOD FOR ESTABLISHING AND MONITORING THE RELATIVE LOCATION OF GROUP MEMBERS

CROSS REFERENCE TO RELATED APPLICATIONS

This application claims priority under 35 U.S.C. § 119(e) from provisional application No. 60/533,748 filed Dec. 31, 2003. The 60/533,748 provisional application is incorporated by reference herein, in its entirety, for all purposes.

BACKGROUND

This invention relates generally to location systems. More particularly, the invention provides a system and method for monitoring the location of members of a group relative to each other and relative to a perimeter for ingress or egress.

It is every parent's worst nightmare to have an outing with the children for shopping or recreational purposes and to turn around and suddenly find that a child is no longer within a line of sight, whether because the view to the child is obstructed or because the child has left the location of the parents. It is equally frustrating to become separated from a group or to have a group member unaccounted for. Endless hours are spent fretting and searching because a group member is missing or because a group member was left behind.

Location technologies have been developed to assist in the location of individuals as well as objects. Global Positioning Systems, which are funded and controlled by the U.S. Department Of Defense, have found many thousands of civilian users all over the world. Global Positioning Systems (GPS) provides specially coded satellite signals that can be processed in a GPS receiver enabling the receiver to compute position, velocity, and time. GPS is used by civilians without charge or restrictions. The actual position of a GPS receiver can be determined quite accurately. GPS systems have found their way into automobiles, military vehicles, civilian defense and all manner of other vehicles. For example, hikers use portable GPS systems. Personal digital assistance (PDAs) and other devices increasingly incorporate GPS capabilities. A European funded satellite system called "Galileo" will be available in the near future and will offer even more accurate location capabilities.

Other technologies utilize network topology and transmission parameters to identify a position of a transmitting device. In one such system, the mobile network base station cell area is used as the location of the mobile handset. The positioning accuracy achieved depends upon the network cell size, which, if outside of urban areas, can be large. Another system determines the mobile handset position by measuring the time of arrival of a handset signal to at least three network base stations, which must be synchronized. In yet another system, time measurements are made at special receiving locations to improve overall positioning accuracy.

Cell phones usage is rising dramatically within the United States and throughout the world. It is even the case that many people are abandoning their landlines in favor of an all-digital wireless communication existence. With many people carrying cell phones both on their persons as well as on their vehicles, it was reasoned that one could determine the position of a cell phone at any point in time provided that the cell phone was turned on. Since this is the vast majority of time, an opportunity existed for emergency response personnel to locate a cellular phone user in the event of an emergency.

As a consequence of this, the E911 standard was mandated by the government to allow 911 providers to know where a cellular customer is when a call originates from a cell phone. Broadly speaking, there are two basic types of solutions—network-based solutions and handset-based solutions. In the case of network-based solutions, receivers at known locations (i.e., at base stations) measure the direction or, more typically, the time of arrival of the signal emitted by the mobile unit. In the case of the latter, having a timing reference and knowing the speed that the radio signal travels is a constant (i.e., the speed of light), it is possible to estimate the range of the mobile unit from the base station. With three base stations at known locations making the measurements, it is possible to unambiguously estimate the location of the mobile unit. There are many refinements to this basic triangulation technique including using combinations of angle-of-arrival (direction) and field strength, for example. Systems like this are referred to as network-based solutions for the rather obvious reason that the measurements and calculations are done in the network.

In a handset-based solution, the situation is reversed with the handset making the measurements and the calculations. In one approach, the handset measures the time of arrival of signals transmitted from Global Positioning System ("GPS") satellites and uses a similar triangulation techniques to calculate its position. In the most commonly used approach, some of required processing is actually carried out in the network to improve the performance of the system. Likewise, another commonly used approach, known as Enhanced Observed Time Difference of Arrival ("E-OTD"), is regarded as a hybrid system because the required measurements are distributed between the handset and the network.

In fact, it is anticipated that some GPS applications will be available for cell phones shortly. However, these applications are limited to telling a cell phone user where that user is located or conveying that GPS information to some emergency response vehicle.

While such applications are useful, there is also a tremendous amount of utility to having that location information available directly to other types of users. U.S. Pat. No. 6,362,778 issued to Neher for "A Personal Location Detection System," describes a system and method for transmitting a location request signal to a central station and, in response to the request, providing location information to one or more person on a contact list. While this information is useful, it is limited to providing location information in a reactive mode of a single device.

U.S. Pat. No. 6,100,806 issued to Gaukel for a "Apparatus And Method For Continuous Electronic Monitoring And Tracking Of Individuals," describes an apparatus and method of monitoring mobile objects or persons utilizes the Global Positioning System satellites and cellular telephone communications. Remote units are worn on the monitored person or object. These remote units would comprise a position and data sensors as well as the transmitter device to transmit the information back to a central tracking station. These data for processing and displaying the information. Rules of compliance are described in the context of a house arrest application. The rules allow a very broad range of tracking conditions, involving time, location, observation, and confirmation. Typical rules of compliance for light enforcement restrict the "prisoner" to the house during non-working hours, to allow travel to and from work, and limited travel with prearranged call-in for permission (hereinafter "inclusion" zones). Under these conditions, the central control tracking station defines the house on the computer in terms of a set of coordinates with a certain boundary. Likewise, a route to and from work is defined on the computer as a path with a certain width. In some cases, very loose travel rules may apply, with the limitation being on not allowing the prisoner to visit certain businesses, such as bars or other undesirable locations (hereinafter "exclusion" zones). These locations can be programmed in, monitored, and reported on. The variations are limited only by the ability of law enforcement to devise workable rules of compliance which make reasonable use of resources, are effective, and are agreeable to the courts.

While monitoring the location of an individual is useful, it would be beneficial to the capability to monitor the location of group members relative to each other and to one or more defined boundaries and to relate this information to some or all of the members of the group. The members of a group would comprise an ad hoc network. The location of each device within the ad hoc network would be constantly monitored in relationship to other devices that are members of the ad hoc network. Additionally, the location of each member device would be monitored in relationship to a defined perimeter. Such a system would permit an egress perimeter to be defined, in which member devices are permitted to roam but not leave, and permit an ingress perimeter to be defined, in which member devices are not permitted to enter. The system would provide a graphical display of the proximity of the members of the network to the perimeter boundary and warnings when a boundary is approached or crossed.

SUMMARY

Embodiments of the present invention provide systems and methods for using wireless and location technology to locate members of a group relative to each other on demand. In an exemplary embodiment, an ad hoc network comprises a plurality of monitored units and a server. At least one of the monitored units may further comprise a master unit having additional features or rights relative to other monitored units. Alternatively, the master unit may be a monitored unit that is entitled to receive information about other monitored units, either from the other monitored units or via separate access means. The location of the monitored units relative to each other is determined by the server and reported to the monitored units. In an alternate embodiment, the relative locations of the monitored units are only reported to the master unit, which may further report selected information to the monitored units. Optionally, the coordinates of at least one perimeter are defined and the locations of each monitored unit are tracked relative to perimeter. A perimeter may be an egress perimeter, which defines an area in which monitored units are permitted to roam but from which network monitored units may not leave. A perimeter may be an ingress perimeter, which defines an area in which monitored units are not permitted to enter. An ingress perimeter may reside within an egress perimeter. Optionally, the system would provide a graphical display of the proximity of the monitored units of the network to the perimeter boundary and warnings when a boundary is approached or crossed.

In another embodiment of the present invention, the system enforces rules directed to the relative position of group members to each other and to a perimeter. In this embodiment, how or whether a rule applies to a particular group member is determined by the status of that group member within the group.

In yet another embodiment of the present invention, a system monitors group members relative to each other to determine that each member of the group maintains a proximity to at least one other member of the group. This embodiment allows arbitrary subgroups of a minimum size to operate independently (within some established threshold limit) of other members of the group while enforcing rules that limit how dispersed the subgroups may become relative to each other.

It is therefore an aspect of the present invention to generally allow members of a group to determine the relative location of other members of the group on demand.

It is a further aspect of the present invention to establish a wireless communication device with location technology for continuously uploading position information to a central location (e.g., a central server or a master unit).

It is yet another aspect of the present invention to integrate communication data and location data among a plurality of configurable communication devices.

It is still another aspect of the present invention to establish at the central server user preferences using a communication device having location capabilities to set perimeter boundaries and time reporting requirements.

It is still another aspect of the present invention to establish at a remote unit user preferences using a communication device having location capabilities to set perimeter boundaries and time reporting requirements.

It is yet another aspect of the present invention to establish an egress perimeter to define an area that a monitored unit of an ad hoc network cannot leave.

It is an aspect of the present invention to establish an ingress perimeter to define an area that a monitored unit of an ad hoc network cannot enter.

It is another aspect of the present invention to establish one or more ingress perimeters within an egress perimeter.

It is a further aspect of the present invention to link identifiers (including, by way of example, telephone numbers, cell phone ESN) among communication devices in a database.

It is still another aspect of the present invention to allow real time tracking of a plurality of communication devices that are configurable by a user.

It is a further aspect of the present invention to display a detailed map of the location of communication devices having location capabilities within the configurable network.

It is a further aspect of the present invention to send an alert and/or an alarm to at least one of the communication devices in a configurable network that another communication device is approaching and/or has crossed a perimeter boundary or is no longer able to be monitored.

It is yet another aspect of the present invention to allow a user of communication device having location capabilities to establish a perimeter boundary by marking the shape of the boundary when the user is walking with the communication device having location capabilities.

It is yet another aspect of the present invention to allow a communication device to access a central server to load a user-stored configuration perimeter boundary or a pre-defined perimeter boundary.

It is still another aspect of the present invention to send an alert and/or an alarm to a master unit of within an ad hoc network when a monitored unit within the ad hoc network stops moving.

It is a further aspect of the present invention to send an alert and/or an alarm to at least one of the configurable network users that transmission from another communication device having location capabilities has ceased.

It is still another aspect of the present invention to send an alert and/or an alarm to third parties such as local police or park employees and to provide such third parties access to the prior motion of the missing individual in order to most expeditiously find them.

These and other aspects of the present invention will become apparent from a review of the summary and detailed information that follows.

An embodiment of the present invention comprises a cell phone having a GPS chip set (the GPS cell phone). The network for the GPS cell phone is adapted to comprise a server that, upon initialization by a user continues to track the users' geographic location determined by the GPS chip set. In addition, multiple GPS cell phones can become monitored units of an "ad hoc network," and in that ad hoc network, are permitted to interact with one another.

As an example of an ad hoc network, a group leader includes the group leader's cell phone and the group members' GPS cell phones in an ad hoc network. A unique identifier associated with each GPS cell phone is then designated to the network server and identified as a network. In an embodiment of the present invention, the unique identifier is the cell phone number, but this is not meant as a limitation. Other identifiers associated with cell phones may be used for this purpose. Additionally, the group leader can optionally designate his or her GPS cell phone as the "master" GPS cell phone for this small ad hoc network. Thereafter, the master unit has a number of options available for continual tracking and restriction relating to the motions of monitored units in the ad hoc network relative to the master unit, relative to the GPS cell phones of other group members, and relative to established perimeter boundaries. For example, and without limitation, the group leader may desire a specific perimeter boundary within which all other GPS cell must be located. This is the case where the group leader desires that the group members not go beyond a particular egress perimeter boundary.

In another embodiment of the present invention, the server also serves as the master unit and monitors a group comprising a plurality of monitored units. The server collects data from the monitored units, determines the location of each of the monitored units relative to each other and to perimeter boundaries, and provides location information to each monitored unit. In another embodiment of the present invention, the location information is displayed graphically on the monitored unit in the form of a map. As will be apparent to those skilled in the art of the present invention, the data collected from the monitored units may be acquired from any means, including GPS satellite system, cell phone systems, or from terrestrially-based beacon transmitting stations, without departing from the scope of the present invention.

In another embodiment, the server also functions as the master unit. In this embodiment, the ad hoc network is formed among monitored units entering a defined perimeter. Optionally, a wireless device could be configured so as to refuse membership in the ad hoc network. The members of the ad hoc network within the defined perimeter are located relative to each other and to established perimeter boundaries. Location data is conveyed to all of the other monitored units within the defined perimeter. Each monitored unit may contact all other monitored units based on the location of the monitored unit and without any permanent identifying information being exchanged. By way of illustration and not as a limitation, the defined perimeter may be a bar or other public facility where individuals gather under a reasonable expectation of being approached by strangers.

In yet another embodiment, the server also functions as the master unit. A monitored unit is associated with a proximity list comprising the identity of other monitored units. In this embodiment, a "seeking" monitored unit seeks to be informed when one or more listed monitored units are within a set distance of the seeking monitored unit. Alternatively, the seeking monitored unit may seek to be informed when a group of listed monitored units are within a set distance of the seeking monitored unit.

Embodiments of the present invention provide means for establishing perimeter boundaries. In one embodiment of the present invention, perimeter boundaries are established and enforced at the server. By way of illustration and not as a limitation, the server may be operated on behalf of a park having defined boundaries and internal neighborhoods. Visitors entering the park would be provided remote units that are monitored by the server only within the park boundary. In another embodiment of the present invention, the perimeter boundary is established and enforced by a group leader operating a master unit. For example, and without limitation, a radius from the master unit may be enforced at all times so that other monitored units of an ad hoc network are no more than X distance from the master unit at all times.

In still another embodiment of the present invention, a screen may also be present on the master unit such that the parent can designate with the cursor, or other pointing instrument, map boundaries that are then sent to the network server. These designated map boundaries can then serve as the perimeter boundaries for the alert and alarm functions described below.

Another function that may be used to establish a perimeter boundary is a "walk around" function. In this "walk around" function, a group leader walks a specific perimeter boundary designating periodically where the group leader's master unit is located. Those individual GPS coordinates are then sent to the server to establish a perimeter boundary around, for example, a schoolyard, a shopping center, or other type of perimeter boundary. This perimeter boundary can then be stored with an identifier so that the group leader does not have to walk that perimeter boundary each time he or she desires to establish a perimeter boundary limitation for other monitored units of the ad hoc network.

In yet another embodiment of the present invention, contiguous, but not connected, perimeter boundaries are selected (from appropriated pre-determined and user-defined perimeter boundary files). A group member is offered "safe-passage" option to define rules by which a monitored unit of an ad hoc network may leave one perimeter and enter another without triggering an alert or an alarm. By way of illustration and not as a limitation, a rule may comprise the monitored unit traversing the space between the two perimeters by moving on a course and at a speed determined by the server to be a safe-passage.

Once boundaries are established, a series of different types of alerts and alarms or actions can be selected for the ad hoc network. For the purpose of the discussion that follows, an "alert" comprises a message that a monitored unit of an ad hoc network is approaching a perimeter boundary or has changed an activity state (e.g, monitored unit who is expected to be moving has stopped moving and a monitored unit who is expected to be stationary is moving). An alarm comprises a determination that a monitored unit is potentially in danger, has crossed a perimeter boundary or has remained in an unexpected activity state for an extended period. Again for example, and without limitation, a standardized message could be broadcast to the wireless devices of the ad hoc network saying that they are near or at a perimeter boundary that should not be crossed. Alternatively, an alert or an alarm can simply sound by ringing the cell phone and providing a text message to the user of the cell phone. Another "alarm" can be the automatic implementation of a telephone call from the master unit to other units in the ad hoc network when the units are either approaching a perimeter boundary or cross over a perimeter boundary that was set by the master unit.

Other types of alarms are within the system of the present invention. For example, a time setting can be established whereby any cell phone of the ad hoc network that has been off the air for more than a preset period of time causes an alarm to be sent to the master unit. Additionally, at all times, a map coordinate displays available to the master unit to identify where other cell phones of the ad hoc network are located.

While the previous exemplary embodiments have been described in terms of a cell phone equipped with a GPS chipset, the present invention is not so limited. Any wireless technology that is adaptable to form an ad hoc network and any location technology that is capable of being used with the wireless technology may be used to perform the location and alarm tasks of the embodiments described above.

A communication device with location capabilities of the present invention will also find other uses. For example, an individual who is going running, or camping, can designate their location and route to a local authority before actually leaving on the trip. In this fashion, if a person's communications device deviates significantly from the planned path, that is the perimeter boundary, an alarm can be sounded at a station operated by the local authority. Further, various "safe" areas could also be part of the location and route database such that monitoring on the path of the user of the communication device would cease when the user is in a safe area. Additionally, if the monitored activity involves movement, such as running or bicycle riding, an alert may be issued if the movement stops for a first pre-determined period of time and an alarm may be issued if the movement has ceased for a second, longer, pre-determined period of time. By way of illustration and not as a limitation, an alert comprises contacting the monitored unit of the ad hoc network being monitored and a master unit and requesting an "OK" message from the monitored unit. An alarm comprises notifying the master unit and placing a call to an emergency agency and providing the last known location of the monitored unit.

Since the relative position of users can be instantaneously determined, yet another function of the present invention is to allow people to find one another in the midst of large crowds or large physical venues. In this instance, two users register themselves as a form of ad hoc network thereby allowing each other to query a network server as to a location of the other.

Embodiments of the present invention provide a system for locating a member of a group. Each member of the group comprises a wireless device equipped with location means and accessible via a wireless network. In an embodiment of the present invention, the wireless device is a cell phone, the wireless network is a cell phone network, and the location means is a GPS chip adapted to acquire and process GPS signals. In still another embodiment of the present invention, the system further comprises a second wireless device.

A server accessible via the wireless network is adapted to receive location data from a first wireless device, establish a location rule for the first wireless device, and determine whether the first wireless device is in violation of the location rule established for the first wireless device. In the in the event the first wireless device is in violation of the location rule established for the first wireless device, the location of the first wireless device is reported to the first wireless device.

In another embodiment of the present invention, location rule comprises a proximity threshold relative to a perimeter boundary. In yet another embodiment of the present invention, the perimeter boundary is egress perimeter boundary that defines an area from which the wireless device may not depart. In an alternate embodiment of the present invention, the perimeter boundary is an ingress perimeter boundary that defines an area into which the wireless device may not enter. In another embodiment of the present invention, the location rule comprises a proximity threshold relative to the second wireless device. The proximity threshold relative to the second wireless device comprises a maximum allowable separation threshold.

In still another embodiment of the present invention, the second wireless device is a designated group leader. Alternatively, the server is located on the group leader.

Embodiments of the present invention further provide a system for locating a member of a group relative to a perimeter boundary. The group comprises at least a first member and a second member each comprising a wireless device equipped with location means and accessible via a wireless network. In an embodiment of the present invention, the wireless device is a cell phone, the wireless network is a cell phone network, and the location means is a GPS chip adapted to acquire and process GPS signals.

A server accessible via the wireless network is adapted to receive location data from the first member wireless device, determine the location the first member wireless device relative to a perimeter boundary, determine whether the first member wireless device is within a proximity threshold of the perimeter boundary; and in the event that the first member wireless device is within the proximity threshold of the perimeter boundary, report the location of the first member wireless device to at least the second member wireless device.

In another embodiment of the present invention, the perimeter boundary is egress perimeter boundary that defines an area from which the wireless device may not depart. In an alternate embodiment of the present invention, the perimeter boundary is an ingress perimeter boundary that defines an area into which the wireless device may not enter. In yet another embodiment of the present invention, the server is located on the second member wireless device.

Embodiments of the present invention further provide a system for locating members of a group comprising a plurality of wireless devices. In an embodiment of the present invention, the wireless device is a cell phone, the wireless network is a cell phone network, and the location means is a GPS chip adapted to acquire and process GPS signals. A server accessible via a wireless network is adapted to receive location data from a wireless device, determine the location of the wireless device relative to the location of the plurality of wireless devices, report to the wireless device the location of the wireless device relative to the location of the plurality of wireless devices. In another embodiment of the present invention, the server is located on one of the plurality of wireless devices.

Embodiments of the present invention further provide a method for locating wireless devices on an ad hoc network. An identifier for a wireless device is created. A location rule for the wireless device is established. Location data from the wireless device is received and a determination whether the wireless device is in violation of the location rule is made. In the event the wireless device is in violation of the location rule, the location of the wireless device is reported to at least one other wireless device on the ad hoc network.

In an embodiment of the present invention, establishing a location rule for the wireless device comprises establishing a proximity threshold relative to a perimeter boundary. Establishing a proximity threshold relative to a perimeter boundary comprises establishing a proximity threshold relative to an egress perimeter boundary that defines an area from which a wireless device may not depart. In another embodiment of the present invention, establishing a proximity threshold relative to a perimeter boundary comprises establishing a proximity threshold relative to ingress perimeter boundary that defines an area into which a wireless device may not enter.

In yet another embodiment of the present invention, establishing a location rule for the wireless device comprises establishing a proximity threshold relative to another wireless device on the ad hoc network. Establishing a proximity threshold relative to another wireless device on the ad hoc network comprises establishing a maximum allowable separation threshold between the wireless device and the another wireless device on the ad hoc network.

The exemplary embodiments are not intended to be limiting. Thus, communication device with location capabilities may include a wireless PDA or a wireless device that uses cell phone frequencies but cannot dial out or receive calls.

These and other applications of the present invention will become apparent to those skilled in the art by review of the detailed description that follows.

DETAILED DESCRIPTION

Embodiments of the present invention provide systems and methods for using wireless and location technology to locate members of a group relative to each other on demand. In an exemplary embodiment, an ad hoc network comprises a plurality of monitored units and a server. One of the monitored units may further comprise a master unit having additional features or rights relative to other monitored units. The location of the monitored units relative to each other is determined by the server and reported to the monitored units. In an alternate embodiment, the relative locations of the monitored units are only reported to the master unit, which may further report selected information to the monitored units. Optionally, the coordinates of at least one perimeter are defined and the locations of each monitored unit are tracked relative to perimeter. A perimeter may be an egress perimeter, which defines an area in which monitored units are permitted to roam but from which network monitored units may not leave. A perimeter may be an ingress perimeter, which defines an area in which monitored units are not permitted to enter. An ingress perimeter may reside within an egress perimeter. Optionally, the system would provide a graphical display of the proximity of the monitored units of the network to the perimeter boundary and warnings when a boundary is approached or crossed. Additionally, the system can infer whether a perimeter is an ingress or egress perimeter by the initial location of the monitored unit. By way of illustration, a perimeter that encircles a monitored unit is most likely an egress perimeter. A perimeter that is wholly external to the monitored unit is likely to be an ingress perimeter.

The exemplary embodiments of the present invention described below are directed to using satellite GPS-based location devices to perform the tasks of creating an ad hoc network and locating users. As previously noted, these exemplary embodiments are provided for illustration purposes not as limitations. Portable location devices that use technology other than satellite GPS may be used to perform the tasks described herein. As will be apparent to those skilled in the art of the present invention, the data collected from the monitored units may be acquired from any means, including GPS satellite system, cell phone systems, or from terrestrially-based beacon transmitting stations, without departing from the scope of the present invention.

Figure 1:
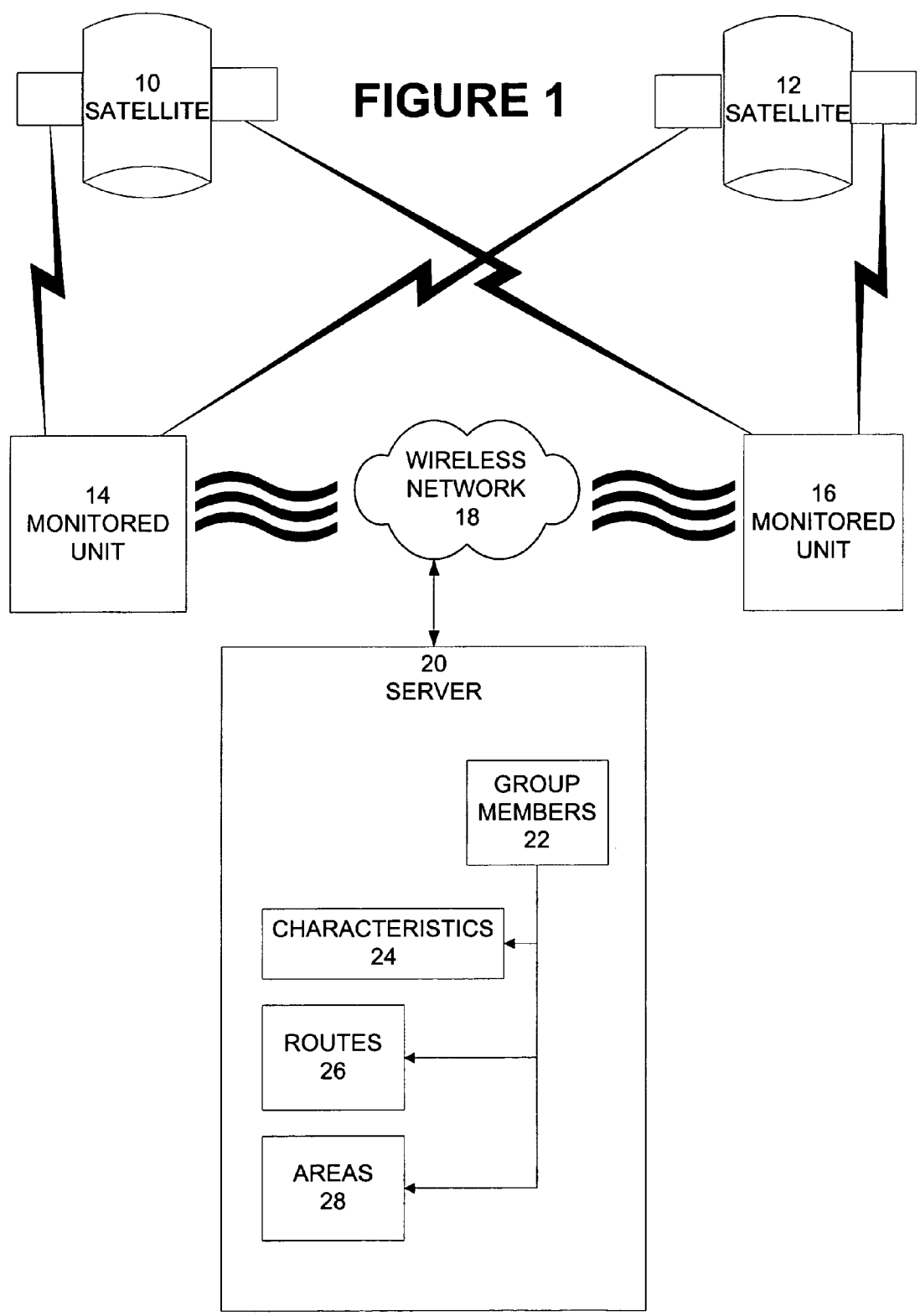
FIG. 1 illustrates a block diagram of the wireless GPS-based ad-hoc network according to an exemplary embodiment of the present invention.

FIG. 1 illustrates a block diagram of the GPS-based ad-hoc network according to an exemplary embodiment of the present invention. Referring to FIG. 1, GPS satellites 10,12 provide signals to a monitored unit 14 for establishing the position of the monitored unit 14 and its user. Using current technology, four satellites are used to create the XYZ position of the user. For clarity, only two satellites are illustrated. Those will skill in the art will understand that additional satellite signals are required. The monitored unit 14 establishes its position and relays that position to a wireless network 18. A server 20 is connected to the wireless network 18 for receiving that information as discussed further below. Characteristics of each monitored unit are stored in the characteristics file 24.

Similarly monitored unit 16 receives signals from satellites 10,12 and establishes its position. Monitored unit 16 relays that position to the wireless network 18 and thereafter to server 20 for further action.

It is envisioned that various group members will register with server 20 to obtain location services server, thus generating additional revenue for the server operator. Further, the server operator will have a database of users 22 that identifies the user and various additional characteristics associated with the user. For example, a monitored unit may be designated as a "master" unit of the system. This would imply certain rights and privileges associated with that status. Such rights and privileges might be, for example and without limitation, the ability to invite other monitored units into an ad hoc network, the ability to set perimeter boundaries, and the ability to terminate the group membership of a monitored units.

A group member who desires to establish travel routes establishes a data file of routes to be used 26 for subsequent tracking. In this embodiment, a standard route may be defined and stored in a route database. By way of illustration and not as a limitation, a route may be defined for a self-guided tour, for a exercise purposes, to manage a person with disabilities, or to limit a group member to a known route to school or other activity. Each route is named or numerically designated so it does not have to be entered multiple times. In an embodiment of the present invention, a route comprises an egress perimeter defined by one or more deviation thresholds comprising a distance from the route. Violation of a first deviation threshold would cause a warning to be issued. Violation of a second deviation threshold would cause an alarm to be issued and remedial action to be taken. Alternatively, a group member may request that a route be determined based on movement tracked in an automated way. In this embodiment of the present invention, the group member notifies the database when to begin and end tracking. When tracking ends, the group member is prompted whether the route is to be saved, and, if so, under what name.

In a similar fashion, a group leader can establish egress perimeter for monitored units. The group leader would be advise should any monitored unit leave the egress perimeter or, alternatively, approach the egress perimeter boundary. The perimeter database (as more fully set below) is established by the group member and stored in a perimeter database. Similar to the route database, perimeter databases can be named or numerically designated so that they do not have to be entered on multiple occasions.

Other features of the network also allow a particular group member to act as a group leader and designate what monitored units are permitted in this ad hoc network. Such permissions will have different levels, for example, to be able to see other monitored units of the network on a GPS cell phone display, to allow other monitored units of the ad hoc network to be designated, and other factors.

In addition, any particular group member, if having the appropriate permissions, can establish a form of "buddy list" for other group members. Thus when a particular group member is located in a large mall, for example, and a person who is on the GPS cell phone buddy list comes into that area that is defined by the mall those other monitored units of the ad hoc network can be notified of the presence of that additional group member and vice versa. In this fashion, individuals or groups of individuals who are in the same locale can be notified when another monitored unit, who they would want to invite into their group, comes into a defined area.

Figure 2:
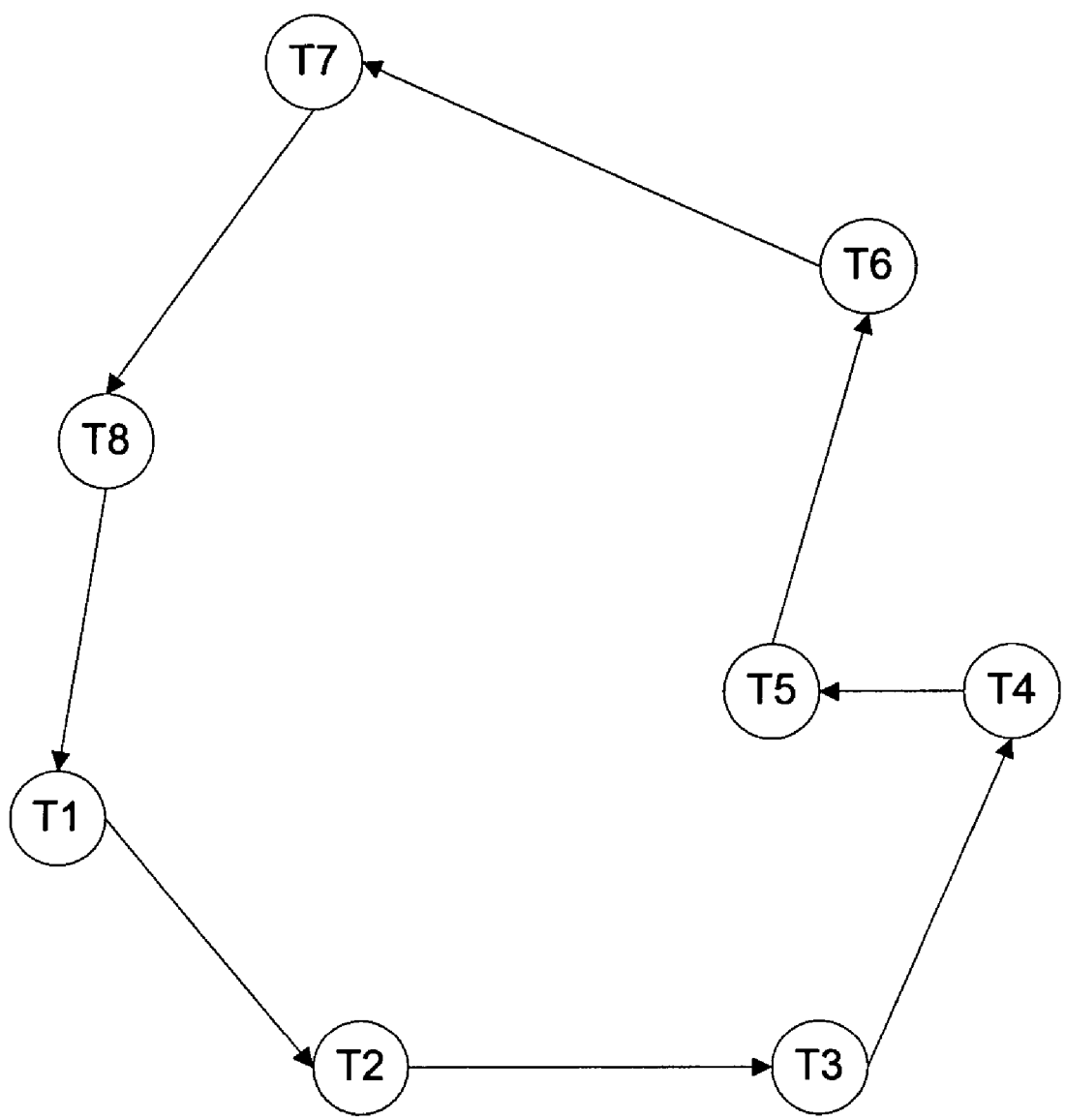
FIG. 2 illustrates a perimeter boundary designation by a user according to an exemplary embodiment of the present invention.

FIG. 2 illustrates a perimeter boundary designation by a group member using a GPS cell phone according to an embodiment of the present invention. Since a GPS cell phone is constantly sending signals to the server giving the geographic location of the GPS cell phone and hence the group member, the group member has the unique opportunity to establish perimeter boundary areas that the group member can save to the perimeter database. These perimeter boundary areas would denote areas that, for example, A group leader would want group members to stay within and for which an alert or an alarm would be issued if the group member were to proceed out of the bounded area. In this instance, a group member has several different ways to establish a perimeter boundary. Referring to FIG. 2, a group member invokes a perimeter boundary-setting function by notifying the server that a perimeter boundary is to be established. Thereafter the group member could proceed from spot T1 to T2 and send a signal that one leg of the perimeter boundary is complete. The group member could then proceed from point T2 to point T3 again sending another signal, and from T3 to T4, sending yet another signal. The group member would then proceed around the desired bounded area sending signals from locations T5, T6, T7, T8 and back at T1. This completes the perimeter boundary that the group member can then store for a specific period of time or as a generally stored area that will have multiple uses. An alternative method of establishing the perimeter boundary is for the group member to notify the server invoking the perimeter boundary-setting function and simply start the function proceeding from point T1 to T2, T3, T4, T5, T6, T7, T8, and back to T1. At that point the group member would designate to the server that the perimeter boundary is closed. The server in turn would be receiving a constant series of signals from the group member's GPS cell phone thereby mapping the route of the group member, storing it, and establishing that closed route as a perimeter boundary.

Figure 3A:
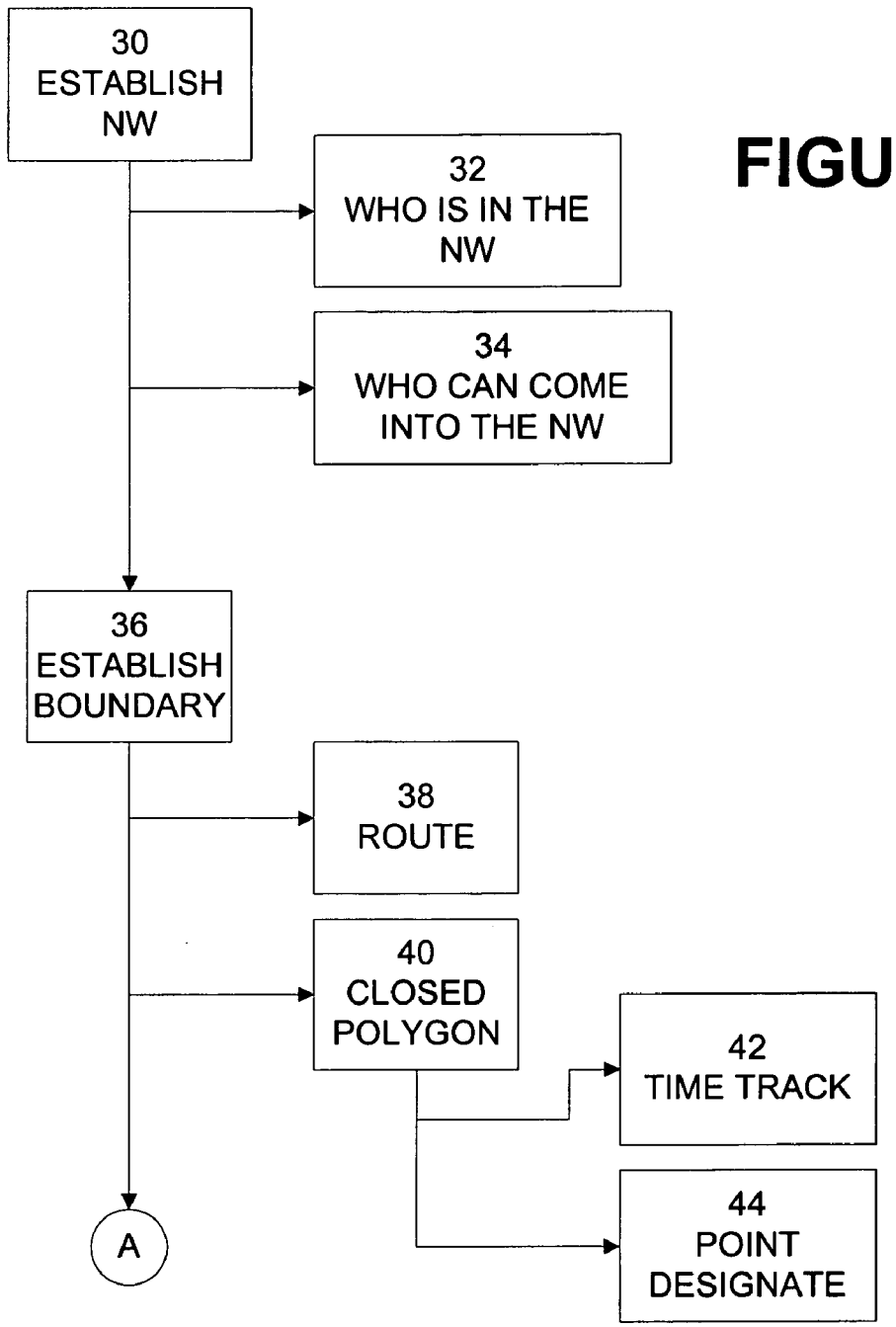
FIGS. 3A and 3B illustrates various steps in establishing a network according to an exemplary embodiment of the present invention.
Figure 3B:
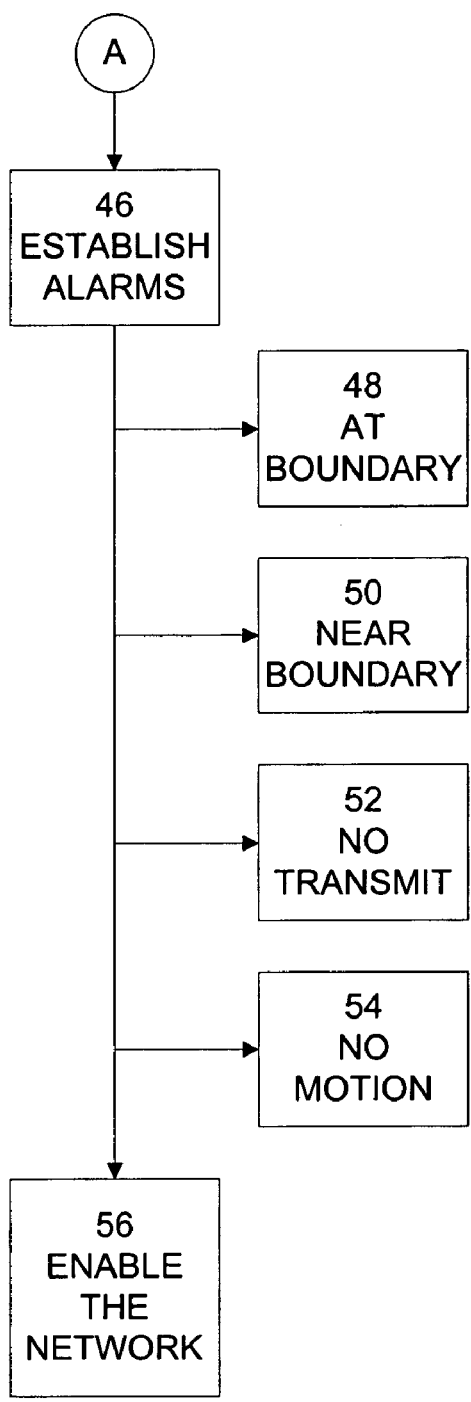

FIGS. 3A and 3B illustrate various steps in establishing a network according to an embodiment of the present invention. Referring to FIG. 3, the GPS cell phone group member first notifies the server of the present invention that it wishes to establish an ad hoc network 30. This notification is required since the GPS cell phone will mostly function as a cellular telephone with GPS features invoked selectively. The server will then send a signal to the group member to designate those GPS cell phone numbers that the group member desires to have in the ad hoc network 32. The group member will optionally have the ability to designate GPS cell phone numbers for those group members who can come into the ad hoc network 34 during the time period that the ad hoc network is enforced. Once the membership in the ad hoc network is established, the group member is then requested to establish the desired perimeter boundary 36. That "perimeter boundary" could be a route that is established 38 or a route that has already been previously established by a unique identifier. The group member also has the option of establishing a closed polygon perimeter boundary 40. In that instance, the group member is given the option to establish such a perimeter boundary by a time tracking function 42 wherein the group member's geographic location is tracked over a period of time until the group member designates the system of the present invention to stop tracking. This will then record the path of a group member thereby establishing a perimeter boundary. Alternatively, the group member can perform a point designation perimeter boundary 44 as noted in FIG. 2.

The group member has now established who can be a monitored unit of the ad hoc network, and what the perimeter boundaries associated with the ad hoc network would be. The group member is prompted to establish the alerts and/or alarm thresholds 46 that the group member would like to have available. These alert/alarm thresholds can be varying. For example, an alarm can be issued when any monitored unit of the ad hoc network is at the perimeter boundary 48, and an alert can issued when a monitored unit is within a predefined distance of the perimeter boundary 50. An alert/alarm can be issued not only for the group leader but for those other monitored units of the ad hoc network.

The group member can also establish an alert/alarm threshold in the event that there is no transmission 52 from any of the monitored units of the ad hoc network for some period of time. Where this occurs, an alert/alarm will issued for the group leader and the last known position of any ad hoc monitored unit network is noted. The group member can also choose to have an alert/alarm issued when no motion of one of the monitored units of the ad hoc network is detected 54. Again an alert/alarm will be issued for the group leader and the last geographically designated location of the ad hoc network monitored unit will be displayed.

It should be noted that the order of these activities noted above are not specific. For example, alarms may be established by the group member first, membership in the ad hoc network second, and perimeter boundary establishment third, or any combination thereof. Thus the order presented in this description is not determinative.

Once the group leader has established all of the characteristics of the network, the group leader enables the network 56. Thereafter group members in the network can be tracked and notified.

It should also be noted that a perimeter boundary function can be established by a group member whereby a certain distance from the group leader can be established as the perimeter boundary. In this fashion as the group leader moves throughout a large area, a radius of, for example, 100 yards can be established so that at all times monitored units of the ad hoc network must be within 100 yards of the group leader.

As noted earlier, various permissions may be established for each of the monitored units of the ad hoc network. Further these permissions may vary from group member to group member. Thus one group member may be allowed to designate additional monitored units to come into the ad hoc network, while other group members may not have such permissions. One monitored unit of the ad hoc network can have the ability to establish perimeter boundaries where other monitored units do not have that ability. In short, the permissions granted for monitored units of the ad hoc network can vary from group member to group member.

Additionally, the alerts/alarms noted above are not meant as a limitation. Many different types of alerts/alarms are available with this system. For example, an alert/alarm may be issued to all group members or a specific group member when someone on the "buddy list" comes into the perimeter boundary area. Further, an alert/alarm can be issued when a monitored unit leaves the perimeter boundary area. Other types of alerts/alarms may also be employed without limitation.

Using the present invention, a mother can track a group member within a park area by not only setting a perimeter boundary of the area that describes the park but by tracking the GPS cell phone associated with each group member. Information can be sent to the group leader in real time and, whenever the group leader desires to find a particular group member, that function can be invoked and the physical location of the group member can be determined. For example, the physical location may be displayed on a map showing the relative location of the group leader and the group member. The map may be centered on the group leader, the group member or on a nearby landmark.

In yet another embodiment of the present invention, a pet may be fitted with a monitored unit and tracked in a similar fashion as a group member.

A system and method for determining personal location has now been illustrated. It will be apparent by those skills in the art that other configurations, alerts/alarms, perimeter boundary-setting techniques, and other elements may be constructed from this specification without departing from the scope of the description herein. While the claims appended hereto refer to wireless devices in the singular, this is not meant as a limitation. Those skilled in the art of the present invention will appreciate that multiple wireless devices in communication with one another are contemplated as within the scope of the present invention.

What is claimed is:

1. A system for locating a member of a group, wherein each member of the group comprises a portable wireless monitored device equipped with location means, the system comprising:

at least first portable wireless monitored device and a second portable wireless monitored device each equipped with location means, wherein the first and second portable wireless monitored devices are accessible via a wireless network; and a server accessible via the wireless network, the sever adapted to:

receive location data from the first portable wireless monitored device and the second portable wireless monitored device;

establish a location rule for the first portable wireless monitored device, wherein the location rule comprises a proximity threshold relative to the second portable wireless monitored device and wherein the proximity threshold relative to the second portable wireless monitored device comprises a maximum allowable separation threshold;

determine whether the first portable wireless monitored device is in violation of the location rule established for the first portable wireless monitored device; and in the event the first portable wireless monitored device in violation of the location rule established for the first portable wireless monitored device, report the location data of the first portable wireless monitored device directly to the first portable wireless monitored device.

2. The system of claim 1, wherein the server is further adapted to in the event the first portable wireless monitored device is in violation of the location rule established for the first portable wireless monitored device, report the location data of the first portable wireless monitored device directly to the second portable wireless monitored device.

3. The system of claim 1, wherein the first and second portable wireless monitored devices are a cell phone.

4. The system of claim 3, wherein the wireless network is a cell phone network.

5. The system of claim 1, wherein the location means comprises a GPS chip adapted to acquire and process a GPS signal.

6. The system of claim 1, wherein the server is located on the second portable wireless monitored device.

7. The system of claim 1, wherein the first portable monitored wireless device comprises a display and wherein the display is adapted to receive and to display the location data.

8. The system of claim 7, wherein the location data is displayed in a form selected from the group consisting of a text message and a graphical display.

9. A system for locating a member of a group relative to a perimeter boundary comprising:

the group comprising at least a first member and a second member, each comprising a portable wireless monitored device equipped with location means, wherein the portable wireless monitored device is accessible via a wireless network; and a server accessible via the wireless network, the server adapted to:

receive location data from the first member portable wireless monitored device;

determine the location the first member portable wireless monitored device relative to a perimeter boundary;

determine whether the first member portable wireless monitored device is within a proximity threshold of the perimeter boundary; and in the event that the first member portable wireless monitored device is within the proximity threshold of the perimeter boundary, report the location data of the first member portable wireless monitored device directly to at least the second member portable wireless monitored device.

10. The system of claim 9, wherein the portable wireless monitored device is a cell phone.

11. The system of claim 10, wherein the wireless network is a cell phone network.

12. The system of claim 9 wherein each of the location means comprises a GPS chip set adapted to acquire and process a GPS signal.

13. The system of claim 9, wherein the perimeter boundary is an egress perimeter boundary that defines an area from which the portable wireless monitored device may not depart.

14. The system of claim 9, wherein the perimeter boundary is an ingress perimeter boundary that defines an area into which the portable wireless monitored device may not enter.

15. The system of claim 9, wherein the server is located on the second member portable wireless monitored device.

16. The system of claim 9, wherein the portable wireless monitored device comprises a display and wherein the display is adapted to receive and to display the location data.

17. The system of claim 16, wherein the location data is displayed in a form selected from the group consisting of a text message and a graphical display.

18. A system for locating members of a group comprising:
the group comprising a plurality of portable wireless monitored devices; and
a server accessible via a wireless network, the server adapted to:
receive location data from a portable wireless monitored device;
determine the location of the portable wireless monitored device relative to the location of the plurality of portable wireless monitored devices; and
report to the portable wireless monitored device the location data of the portable wireless monitored device relative to the location of the plurality of portable wireless monitored devices.

19. The system of claim 18, wherein the portable wireless monitored device is a cell phone.

20. The system of claim 19, wherein the wireless network is a cell phone network.

21. The system of claim 18 wherein each of the location means comprises a GPS chip adapted to acquire and process a GPS signal.

22. The system of claim 18, wherein the server is located on one of the plurality of portable wireless monitored devices.

23. The system of claim 18, wherein the portable wireless monitored device comprises a display and wherein the display is adapted to receive and to display the location data.

24. The system of claim 23, wherein the location data is displayed in a form selected from the group consisting of a text message and a graphical display.

25. A method for locating portable wireless monitored devices on an ad hoc network comprising:
creating an identifier for a portable wireless monitored device;
establishing a location rule for the portable wireless monitored device;
receiving location data from the portable wireless monitored device;
determining whether the portable wireless monitored device is in violation of the location rule; and
in the event the portable wireless monitored device is in violation of the location rule, reporting the location data of the portable wireless monitored device directly to at least one other portable wireless monitored device on the ad hoc network.

26. The method for locating a portable wireless monitored device on an ad hoc network of claim 25, wherein establishing a location rule for the portable wireless monitored device comprises establishing a proximity threshold relative to a perimeter boundary.

27. The method for locating a portable wireless monitored device on an ad hoc network of claim 26, wherein establishing a proximity threshold relative to a perimeter boundary comprises establishing a proximity threshold relative to an egress perimeter boundary that defines an area from which a portable wireless monitored device may not depart.

28. The method for locating a portable wireless monitored device on an ad hoc network of claim 26, wherein establishing a proximity threshold relative to a perimeter boundary comprises establishing a proximity threshold relative to ingress perimeter boundary that defines an area into which a portable wireless monitored device may not enter.

29. The method locating a portable wireless monitored device on an ad hoc network of claim 25, wherein establishing a location rule for the portable wireless monitored device comprises establishing a proximity threshold relative to another portable wireless monitored device on the ad hoc network.

30. The method for locating a portable wireless monitored device on an ad hoc network of claim 29, wherein establishing a proximity threshold relative to another portable wireless monitored device on the ad hoc network comprises establishing a maximum allowable separation threshold between the portable wireless monitored device and the another portable wireless monitored device on the ad hoc network.

31. The system of claim 25, wherein the portable wireless monitored device comprises a display and wherein the display is adapted to receive and to display the location data.

32. The system of claim 31, wherein the location data is displayed in a form selected from the group consisting of a text message and a graphical display.

* * * * *